United States Patent [19]
Baxter et al.

[11] 3,761,005
[45] Sept. 25, 1973

[54] APPARATUS FOR ALIGNING AND JOINING TUBULAR MEMBERS

[75] Inventors: Howard Arthur Baxter, Califon, N.J.; Paul Edwin Young, Cedar Falls, Iowa

[73] Assignee: Bell Telephone Laboratories, Incorporated, Murray Hill, N.J.

[22] Filed: Apr. 20, 1972

[21] Appl. No.: 245,822

[52] U.S. Cl............................ 228/4, 29/484, 29/493, 228/6, 228/44
[51] Int. Cl............................................. B23k 37/04
[58] Field of Search ..................... 228/4, 6, 25, 29, 228/32, 44; 29/484, 493; 219/59, 125

[56] References Cited
UNITED STATES PATENTS

| | | | |
|---|---|---|---|
| 1,775,311 | 9/1930 | Halle | 228/29 X |
| 3,412,226 | 11/1968 | Kobb | 219/101 X |
| 3,349,216 | 10/1967 | Paton et al | 219/101 X |
| 3,509,302 | 4/1970 | Fielder et al | 228/29 X |

*Primary Examiner*—J. Spencer Overholser
*Assistant Examiner*—Robert J. Craig
*Attorney*—W. L. Keefauver et al.

[57] ABSTRACT

Tubular waveguide sections are accurately aligned and joined by apparatus including a pair of alignment sleeves which surround and grasp the flanges of adjacent waveguide sections. The flanges are centered in the respective sleeves by alignment pins therein and the sleeves are aligned with each other by a plurality of alignment bars placed along the exterior thereof. A hydraulic cylinder presses the aligned flanges together in compression to a preload level preselected to prevent separation of the flanges and waveguide sections during any subsequent bending of the waveguide. A welding head welds the preloaded flanges. The alignment sleeves include a manifold therein through which a cooling fluid is circulated during the welding to prevent damage to the waveguide lining from excessive heat.

9 Claims, 9 Drawing Figures

PATENTED SEP 25 1973 3,761,005

APPARATUS FOR ALIGNING AND JOINING TUBULAR MEMBERS

BACKGROUND OF THE INVENTION

1. Field of the Invention

This invention relates to waveguide transmission systems and in particular to apparatus for splicing sections of waveguide to form a continuous waveguide line.

2. Description of the Prior Art

The increasing demand for communication services has created great interest in the potentials of a broadband waveguide transmission system. It is probable that the waveguide for such a system will be manufactured in short sections which will then be coupled or spliced during field installation to form a continuous waveguide line. Because of the number of couplings or splices which will be required and the frequency and modes of transmission, it is imperative that very accurate alignment of the waveguide sections be maintained. Even small misalignment will cause the preferred mode of transmission, which will probably be the $TE_{01}$ mode, to degenerate into spurious modes thereby causing excessive attenuation and distortion.

It is also imperative that the couplings or splices be mechanically strong to prevent any separation or misalignment of the waveguide sections from bending stresses occurring in route bends and from temperature variations. Further the splice must provide complete sealing of the waveguide interior to preserve the special atmosphere therein and to prevent ingress of substances such as oxygen which would adversely affect transmission.

Various types of couplings have been proposed for a waveguide line. These include bolted flange arrangements, tapered aligning and clamping rings, and threaded sleeves into which adjacent sections of waveguide are screwed. However, none of the proposed couplings has satisfactorily met the requirements of precise alignment, high strength and mechanical integrity. A welded splice offers advantages over the foregoing couplings especially with respect to mechanical strength and integrity. Although welded pipe joints are known in the prior art, the techniques and apparatus for forming such joints are clearly not adequate to provide the highly accurate splices required in a waveguide system. Further the existing apparatus would provide no protection for the interior of the waveguide from the excessive heat generated during the formation of such welded splices.

Accordingly, it is an object of this invention to improve the techniques and apparatus for splicing or coupling tubular members.

A more specific object is to improve the apparatus for splicing tubular members by welding so that such apparatus can be utilized for splicing sections of waveguide.

SUMMARY OF THE INVENTION

The foregoing objects and others are achieved in accordance with the invention by apparatus which splices waveguide by accurately aligning flanged waveguide sections, preloading the flanges in compression and then joining the flanges by welding while removing weld heat to avoid a high temperature at the inside of the tube. The apparatus comprises two aligning sleeves which surround and grasp the flanges on adjacent waveguide sections. Each sleeve includes a plurality of alignment pins around the inner periphery thereof which provide an interference fit with the outer periphery of the respective flange thereby centering the flange within the sleeve. A plurality of parallel alignment bars fits over the exterior of the sleeves to align the sleeves with respect to each other. A hydraulic force presses the flanges together while alignment is maintained by the bars. The resulting preload prevents separation of the waveguide sections from any subsequent stresses. A rotatable welding head forms a circumferential weld about the flanges to lock in the aligned, preloaded condition. Each sleeve includes a manifold therein through which a cooling fluid flows during the welding operation to prevent damage to the interior of the waveguide sections from excessive heat.

BRIEF DESCRIPTION OF THE DRAWING

The invention will be more fully comprehended from the following detailed description and accompanying drawing in which.

DETAILED DESCRIPTION

Figure 1:
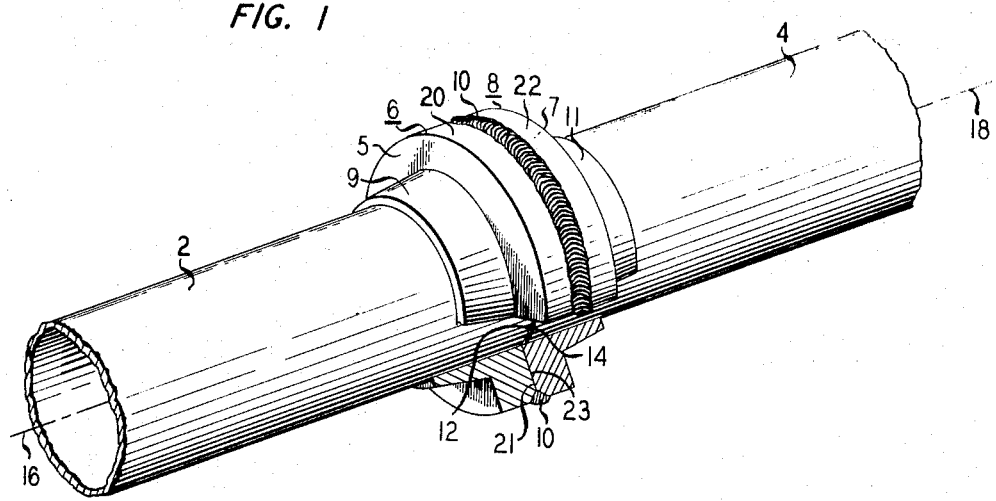
FIG. 1 is a perspective view partly broken away of two waveguide sections joined in accordance with this invention.

Referring now to FIG. 1 there is shown a perspective view partly in section of two waveguide sections 2 and 4 having flanges 6 and 8, respectively, on the adjacent ends thereof which are joined by a weld 10 to form a continuous waveguide line. The ends 12 and 14 of sections 2 and 4 must be very accurately aligned with each other to prevent degradation of the signals which will be transmitted therethrough. This alignment essentially involves two aspects — the offset linear displacement of ends 12 and 14 with respect to each other and the tilt or angular displacement of axes or center lines 16 and 18 with respect to each other. By way of illustration the maximum offset allowable might be on the order of 0.002 inches and the maximum allowable tilt might be on the order of 0.0005 radians. Flanges 6 and 8 can be mounted on waveguide sections 2 and 4 by techniques such as welding, threading or adhesive bonding. During manufacturing it is possible to obtain extremely good alignment between flanges 6 and 8 and the respective sections 2 and 4. Accordingly, the outer surfaces 20 and 22 of flanges 6 and 8, respectively, can be used for registration during the subsequent aligning of sections 2 and 4 and the formation of weld 10.

Figure 2:
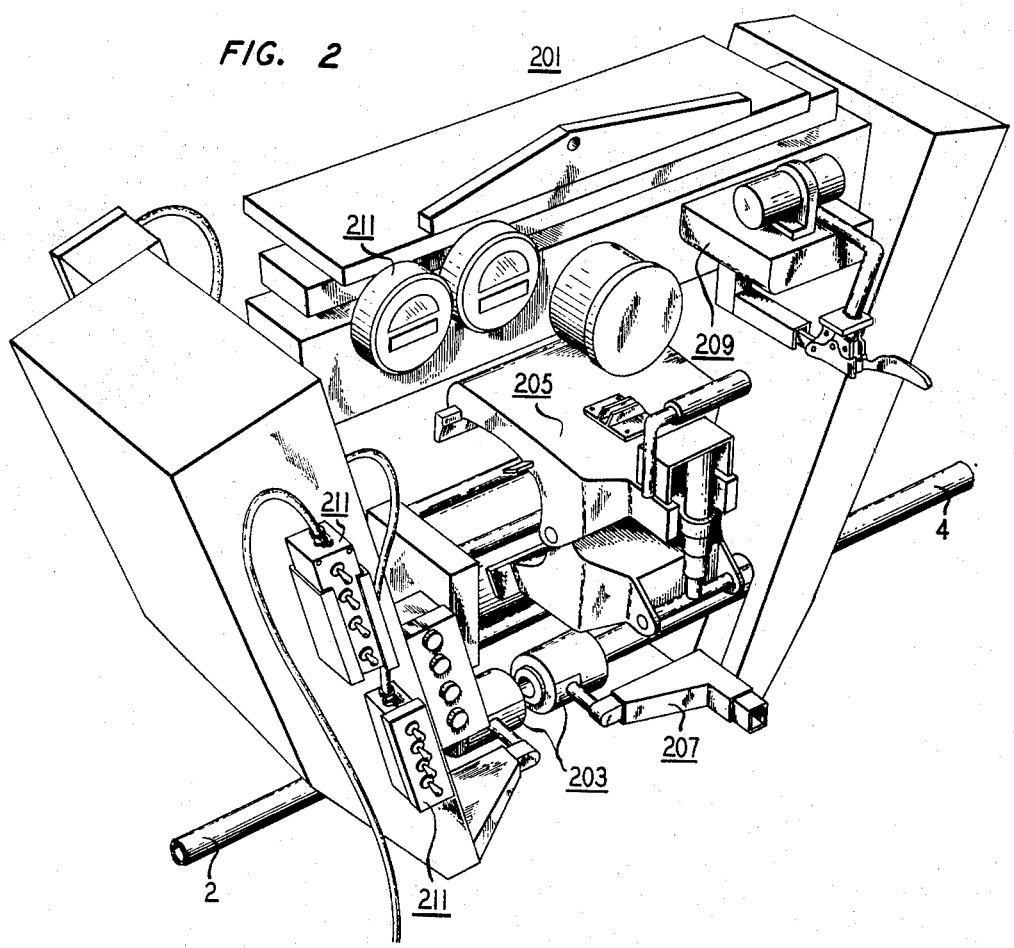
FIG. 2 is a representation of an apparatus or assembly which is used for joining the waveguide sections.

FIG. 2 is a representation of an apparatus or assembly 201 which is used in splicing or joining waveguide sections 2 and 4 as shown in FIG. 1. Apparatus 201 is placed on waveguide sections 2 and 4 as shown, accurately aligns sections 2 and 4 and subsequently joins or splices the flanges thereon by a welding operation. Apparatus 201 includes a sleeve assembly 203 in which the waveguide sections are centered; a sleeve alignment mechanism 205 which aligns the sleeve assembly 203 to thereby align waveguide sections 2 and 4; a preload assembly 207 for bringing the aligned waveguide sections 2 and 4 together and preloading them as desired; a welding assembly 209 for splicing or welding the aligned and preloaded waveguide sections; and control and monitoring apparatus 211 as required. These various components or subassemblies of assembly 201 will be described in detail in the following with reference to figures showing the operation and detailed construction thereof.

Figure 3:
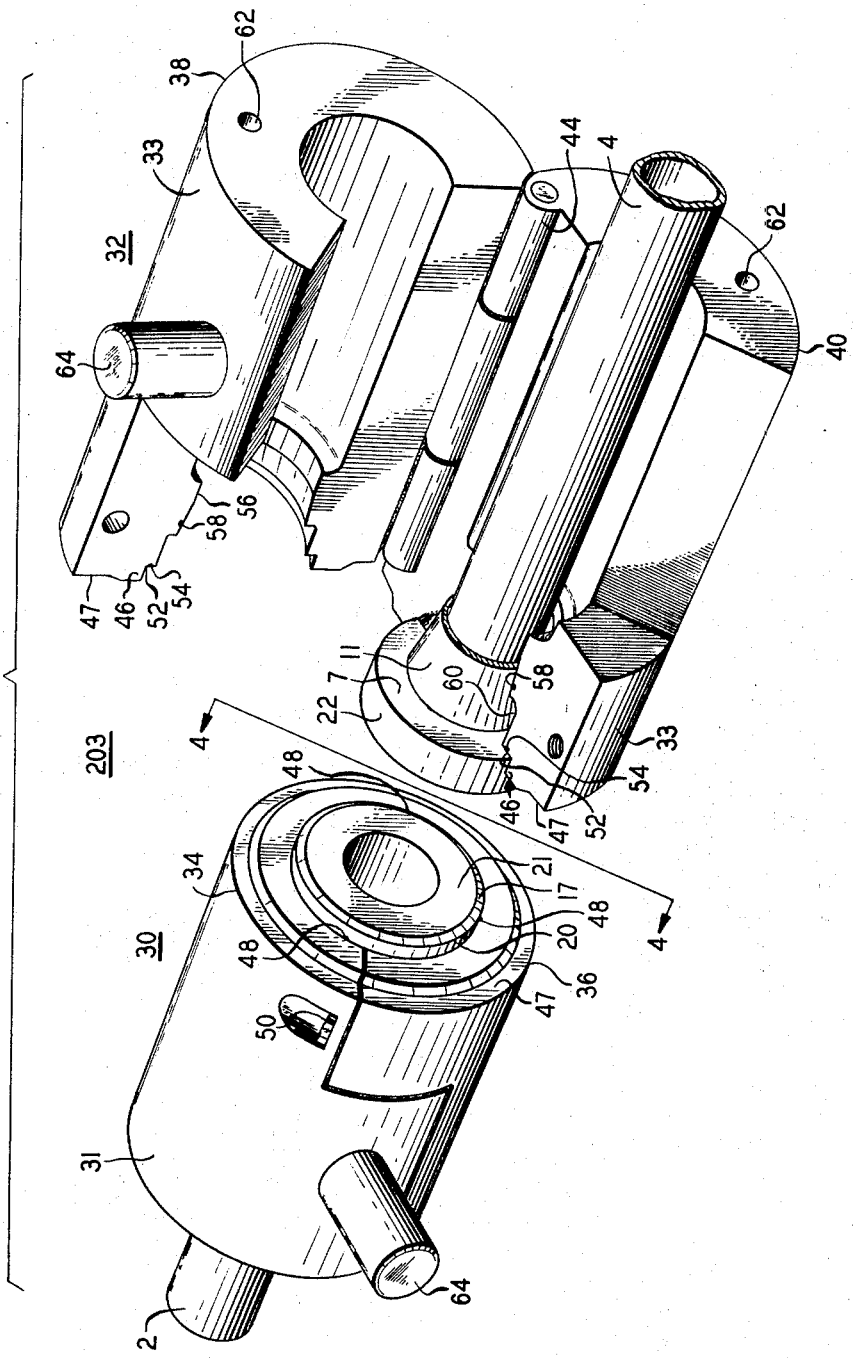
FIG. 3 is a perspective view of a sleeve assembly included in the assembly of FIG. 2.

In FIG. 3 there is shown sleeve assembly 203 comprising a pair of alignment sleeves 30 and 32 used for aligning waveguide sections 2 and 4. Sleeves 30 and 32 each comprise two sections 34 and 36, and 38 and 40, respectively, which are joined by a hinge or pivot 44 so that the sleeve can be opened for installation about the respective waveguide section as is illustrated by sleeve 32. Sleeves 30 and 32 are essentially mirror images of each other so that a description of the features of one sleeve applies equally as well to the features of the other sleeve. Accordingly, the same numbers will be used throughout to refer to specific features regardless of the particular sleeve referred to.

Figure 4:
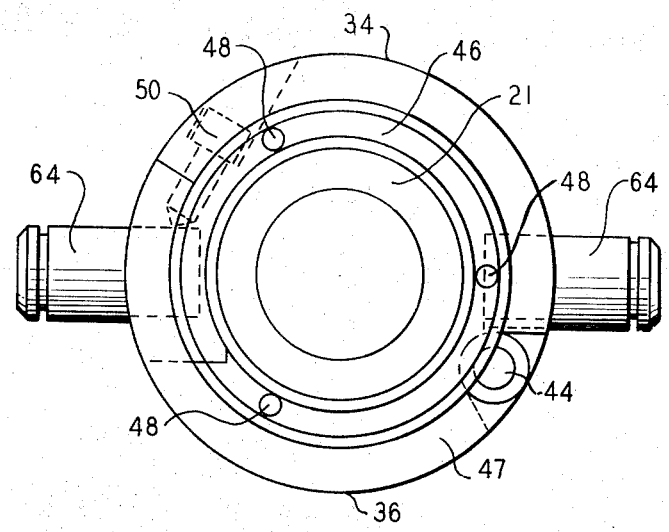
FIG. 4 is a view along direction 4—4 of FIG. 3.
Figure 5:
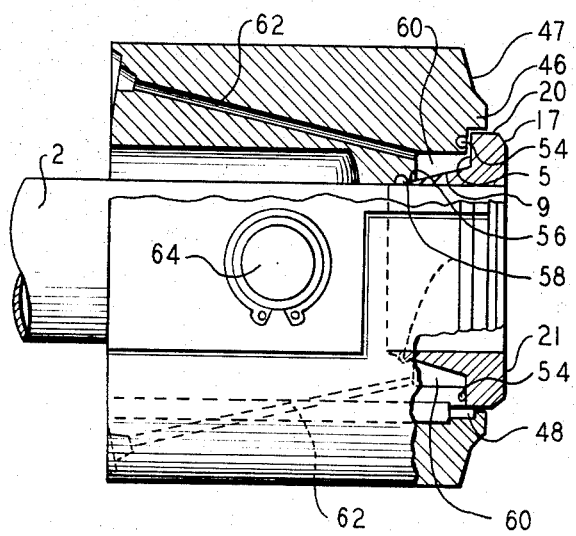
FIG. 5 is a side elevation view partly broken away of one of the sleeves of FIG. 3.

Each sleeve 30 and 32 includes a protruding lip or flange portion 46 which surrounds and is concentric with a portion of the outer surface 20 and 22 of flanges 6 and 8, respectively, as is shown more fully in FIGS. 4 and 5. At approximately equal intervals around the inner periphery of flange 46 are three alignment pins 48. Pins 48 are very accurately located with respect to the outer surfaces 31 and 33 of the respective sleeves 30 and 32 in which they are mounted. Pins 48 are made of very hard material such as a hardened steel. When a sleeve 30 or 32 is closed about a respective flange and waveguide section, pins 48 contact surfaces 20 and 22 with an interference fit. Accordingly, as screws 50 are tightened to lock the sleeve around the respective flange, pins 48 apply forces around the periphery of surfaces 20 and 22 thereby very accurately centering or aligning the flanges and the waveguide sections with respect to the outer surfaces 31 and 33 of sleeves 30 and 32. The use of a hardened metal for pins 48 insures that this centering occurs regardless of variations in the diameters of surfaces 20 and 22 because pins 48 will not yield.

Sleeves 30 and 32 include second flanges 52 which contact the back surfaces 5 and 7, respectively, of flanges 6 and 8 and form a seal therewith through a compliant seal 54 such as a rubber O-ring. Sleeves 30 and 32 also include third flanges 56 which contact and form a seal with the tapered surfaces 9 and 11 at the rear of flanges 6 and 8, respectively, through a second compliant seal 58 which can also comprise a rubber O-ring. Consequently, flanges 52 and 56 in conjunction with seals 54 and 58 define an annular chamber 60 about the rear of flanges 6 and 8. Chamber 60 can be used for the flow of fluid to control the temperature of flanges 6 and 8 during the formation of weld 10 to prevent damage to the waveguide interior from excessive heat generated during the welding operation. For this purpose chambers 60 communicate with a source of coolant such as water through passages 62 formed in sleeves 30 and 32 by drilling or like techniques.

Figure 6:
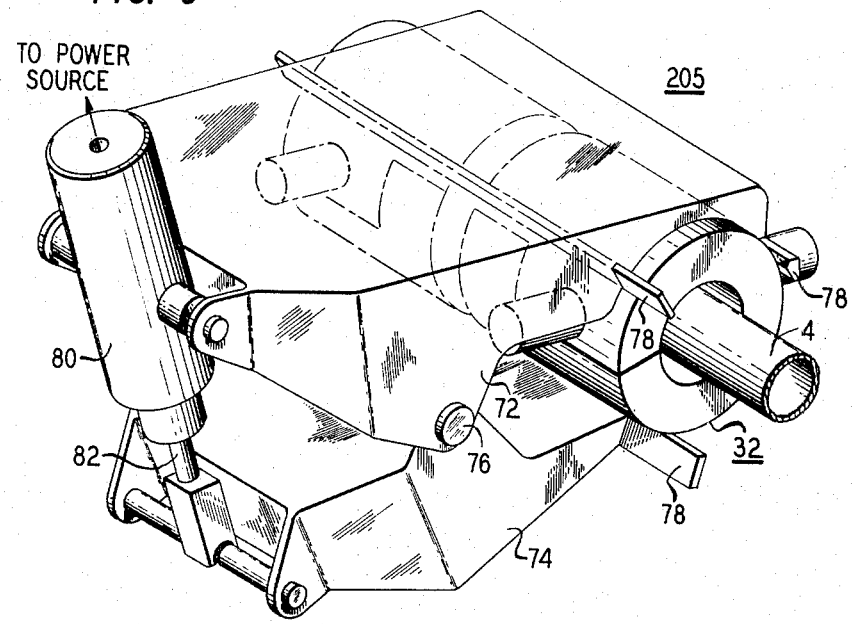
FIG. 6 is a perspective view of a sleeve alignment mechanism utilized in the assembly of FIG. 2.

As previously mentioned, when sleeves 30 and 32 are completely installed about the waveguide flanges, waveguide sections 2 and 4 are accurately aligned with respect to the outer surfaces 31 and 33 of the respective sleeves 30 and 32. Accordingly, sleeves 30 and 32 must then be aligned with respect to each other. This is accomplished by the sleeve alignment mechanism 205 shown in detail in FIG. 6. Mechanism 205 comprises two brackets 72 and 74 pivotally connected to each other by a hinge 76. Bracket 72 has fastned thereto two alignment bars 78 and bracket 74 includes a third alignment bar 78. Alignment bars 78 are parallel with each other within very close tolerances. Brackets 72 and 74 position the parallel bars 8 at approximately equal spacings around the periphery of sleeves 30 and 32. Bracket 72 is connected to the housing of a hydraulic cylinder 80 and bracket 74 is connected to a piston rod 82 operated by cylinder 80. Thus bracket 74 pivots with respect to bracket 72 about hinge 76 when piston rod 82 moves. When piston rod 82 is extended by hydraulic force cylinder 80, brackets 72 and 74 tend to force alignment bar 78 together thereby applying an aligning force around the peripheries of sleeves 30 and 32 which aligns these sleeves with respect to each other.

A major problem in a waveguide system is that of preventing separation of the adjacent waveguide sections as a result of stresses arising from route bends and temperature variations. It has been found that this problem can be substantially eliminated by preloading the spliced flanges in compression to a level sufficient to offset any subsequently occurring tensile stresses from bending or thermal cycling and locking-in this preload. As an example, a preload of approximately 20,000 pounds compression might be adequate to prevent any separation of the waveguide sections under normal anticipated conditions.

Figure 7:
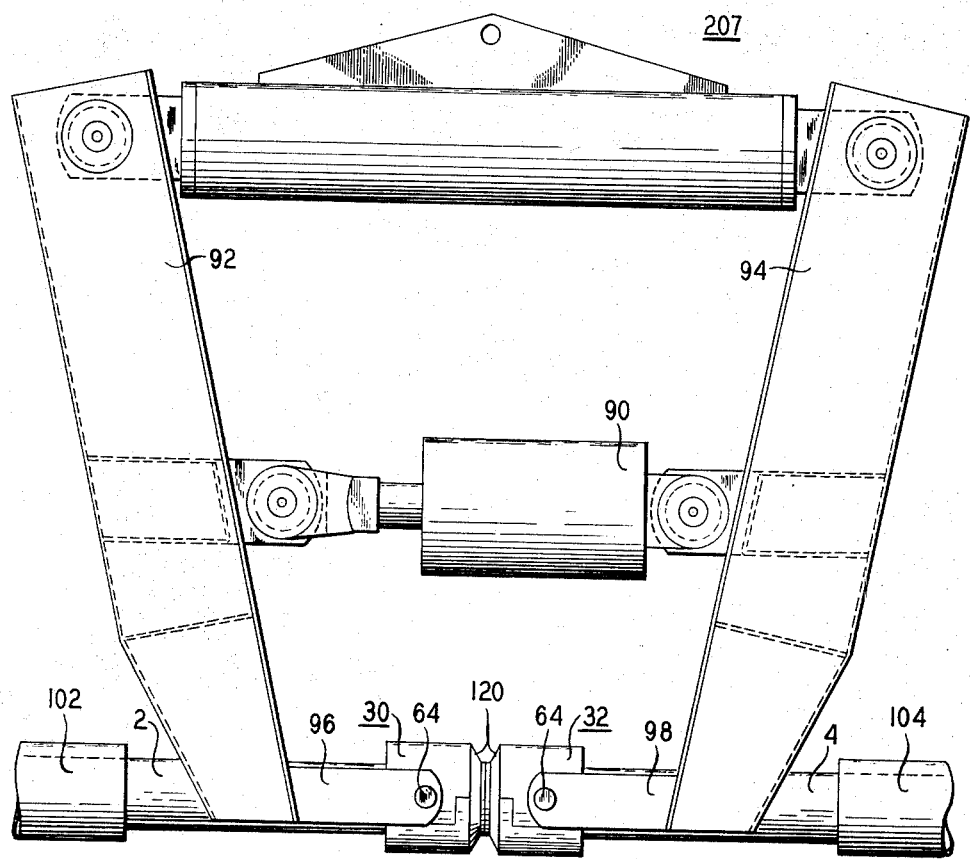
FIG. 7 is a representation of the preload assembly utilized in the apparatus of FIG. 2.

As shown in FIG. 7 a preload is applied to flanges 6 and 8 and waveguide sections 2 and 4 through preload mechanism 207 which applies forces to force pins 64 mounted on the upper halves 34 and 38 of sleeves 30 and 32, respectively. Because of the configuration of the sleeves, it is clear that any axial compression force applied to pins 64, i.e., any force tending to push sleeves 30 and 32 into contact, will be transmitted to both halves of the respective sleeves and thence to flanges 6 and 8. The preloading is applied by a hydraulic cylinder 90 through pivotally mounted brackets or arms 92 and 94 and brackets 96 and 98 which contact to pins 64. The preload is applied while the sleeve aligning mechanism 205 is positioned about sleeves 30 and 32 to insure that the flanges and waveguide sections are accurately aligned as they contact and are subjected to the preload. After the preload has been applied, mechanism 205 can be removed because the preload will then hold the flanges and waveguide sections in an aligned position. The sheath sections 102 and 104 surrounding waveguide sections 2 and 4 are moved away from the splice or joint during the splicing operation. The sheath sections can subsequently be moved together and joined or a small piece of sheath can be bridged across the joint.

Figure 8:
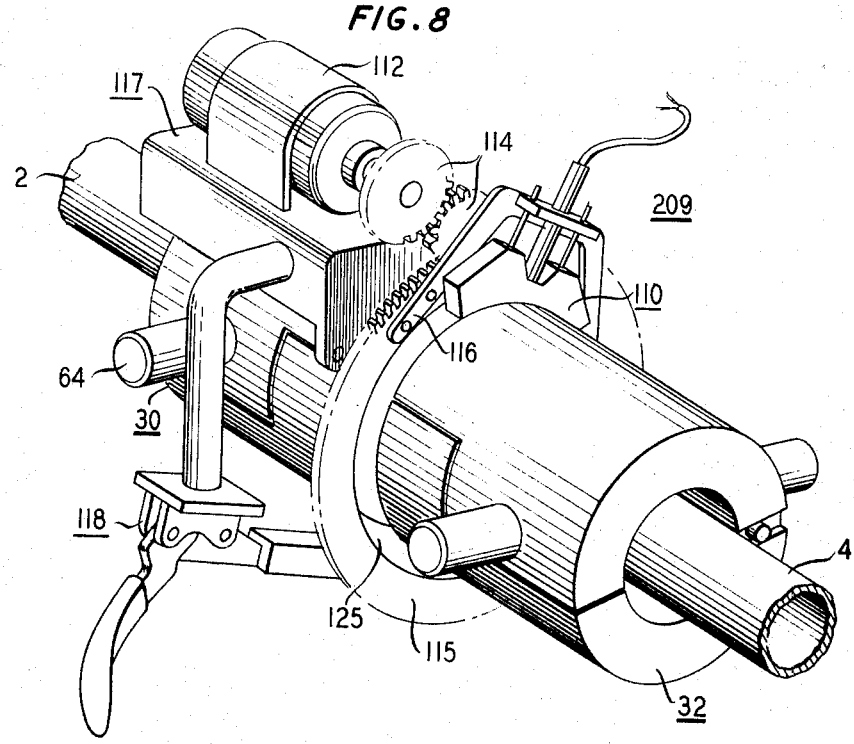
FIG. 8 is a representation of the welding assembly utilized in the apparatus of FIG. 2.

During the preloading of flanges 6 and 8 the faces 21 and 23 thereof, and likewise the ends 12 and 14 of waveguide sections 2 and 4, respectively, are brought into contact and weld 10 is then formed by welding assembly 209 as shown in FIG. 8, while the preloaded aligned condition is maintained. Weld 10 is formed by a welder 110 utilizing techniques known in the art such as metal inert gas (MIG) or tungsten inert gas (TIG) welding. Welder 110 is driven about the peripheries of contacting flanges 6 and 8 by a motor 112 and an intermediate gear arrangement 114 which drives a gear 115 to which welder 110 is mounted by a bracket 116. Motor 112 and gear arrangement 114 are mounted on sleeve 30 by a suitable bracket 117 which is removable by operation of a latch 118. Gear 115 comprises a split gear having two hinged sections which permits gear 115 to be installed around sleeves 30 and 32 in a manner similar to the installation of the sleeves about the waveguide sections as illustrated by sleeve 32 in FIG. 3. As gear 115 is rotated by motor 112 and gears 114, welder 110 is carried about the periphery of flanges 6 and 8. The speed of rotation depends upon the speed of motor 112 and the ratio of gear arrangement 114. Welder 110 travels within the groove 120 formed by the tapered faces 47 of sleeves 30 and 32 and is aligned by rollers riding on these tapered faces and forms weld 10 in the groove defined by the tapered faces 17 of flanges 6 and 8. During the welding operation a coolant is circulated through chambers 60 as previously mentioned to prevent damage to the waveguide interior from excessive heat.

Weld 10 permanently joins flanges 6 and 8 in the prestressed aligned configuration. Accordingly, no difficulties are experienced subsequently by misalignment or separation during installation or operation of a waveguide system utilizing such splices.

The types of control and monitoring apparatus 211 needed for controlling and monitoring the welding operation of assembly 209 and the hydraulic pressures of preload assembly 207 and sleeve alignment mechanism 205 are well known in the art and accordingly are not described in detail herein.

Figure 9:
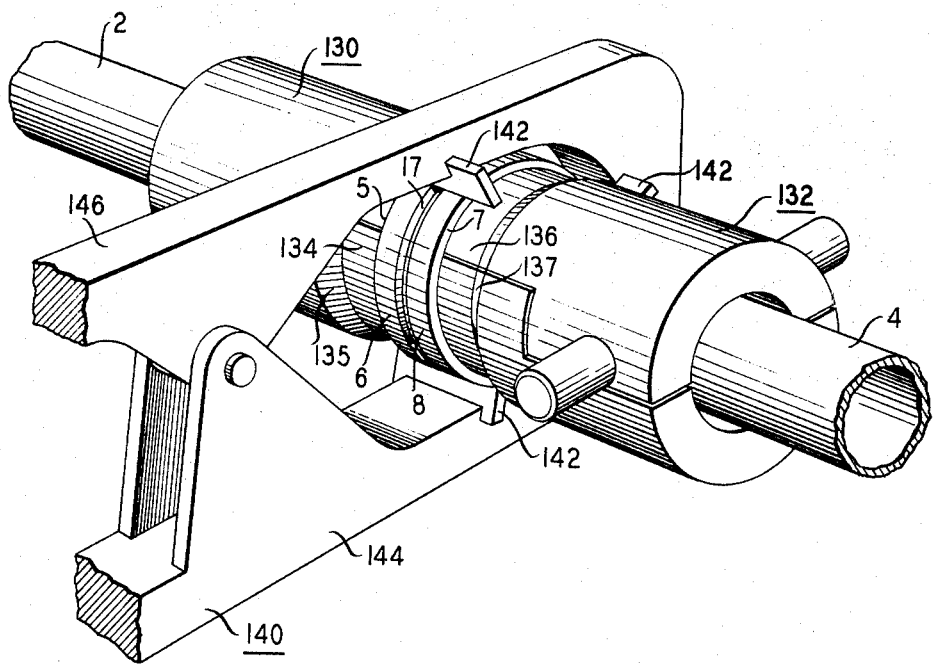
FIG. 9 is a perspective view of a second embodiment of the apparatus shown in FIG. 6.

In the previously described embodiment, waveguide flanges 6 and 8, and accordingly waveguide sections 2 and 4, are aligned with each other by first centering or aligning a respective flange and section within a respective alignment sleeve and then aligning the sleeves 30 and 32 with respect to each other by sleeve alignment mechanism 205. FIG. 9 illustrates a modified embodiment in which the flanges 6 and 8 and waveguide sections 2 and 4 are directly aligned with each other in a single step or operation. Sleeves 130 and 132, as contrasted with sleeves 30 and 32, do not have any flange portion surrounding flanges 6 and 8 but instead have only reduced sections 134 and 136 which contact the back surfaces 5 and 7, respectively, of flanges 6 and 8. An alignment mechanism 140 has two pivotally connected brackets 144 and 146 to which three alignment bars 142 are very accurately mounted with respect to each other. Brackets 144 and 146 are placed about flanges 6 and 8 so that bars 142 contact these flanges at approximately equal angular intervals. Mechanism 140 then functions substantially identical to sleeve alignment mechanism 205 in FIG. 6 to align flanges 6 and 8 when a force is applied to brackets 144 and 146. In essence, alignment bars 142 serve the same function as both the alignment pins 48 and the alignment bars 78 in the previously described embodiment. The preload is applied to flanges 6 and 8 through sleeves 130 and 132 as described with respect to sleeves 30 and 32 in the previous embodiment.

While the invention has been described with respect to specific embodiments thereof, it is to be understood that various modifications thereto might be made by those skilled in the art without departing from its spirit and scope.

What is claimed is:

1. Apparatus for aligning and splicing sections of waveguide having flanges on the ends thereof comprising, in combination:

first and second aligning sleeves adapted for installation about respective ones of said flanges so that said flanges are centered with respect to said sleeves;

alignment means for aligning said sleeves with respect to each other thereby to align said waveguide sections with respect to each other;

force means for forcing said sleeves together while said sleeves are maintained in alignment so that said flanges and said sections abut; and welding means for welding said flanges together thereby to join said waveguide sections while said alignment is maintained.

2. Apparatus in accordance with claim 1 wherein each one of said sleeves includes a first flange portion having a plurality of alignment pins approximately equally spaced around the inner periphery thereof and adapted to contact the outer periphery of one of said flanges when said one sleeve is installed thereabout, said pins being equally spaced from and parallel with the outer surface of said one sleeve, and means for locking said one sleeve about said one flange so that said pins contact said outer periphery of said one flange and apply forces around said outer periphery thereby to center said one flange and said waveguide section with respect to said outer surface of said one sleeve.

3. Apparatus in accordance with claim 1 wherein said flanges include an outer surface along which said welding is performed and a rear surface connecting said outer surface to said respective waveguide section, each of said sleeves including flange portions around the inner periphery thereof which define an annular chamber with said rear surface when said sleeve is installed about said flange and said waveguide section, said sleeves further including openings therethrough connecting with said chamber so that a cooling fluid can be circulated through said chamber to control the temperature of said flanges during said welding to thereby prevent damage to said waveguide.

4. Apparatus in accordance with claim 1 wherein said alignment means comprises a bracket means having a plurality of parallel bars attached thereto, said bracket means being adapted to mount about said sleeves so that said parallel bars are located at substantially equal intervals about the outer surfaces of said sleeves and lie in the direction of the longitudinal axis of said sleeves, and means for applying a force to said bracket means to move said bars toward each other so that each of said bars contacts the outer surfaces of both of said sleeves and apply forces thereto thereby aligning said sleeves with respect to each other.

5. Apparatus in accordance with claim 1 wherein said force means comprises a hydraulic cylinder; and
bracket means interconnecting said cylinder with said sleeves and adapted to apply forces along the longitudinal axes of said sleeves in response to forces produced by said cylinder thereby to force said sleeves together so that said flanges and said sections abut and are preloaded together in compression.

6. Apparatus in accordance with claim 1 wherein said welding means comprises:
a welder;
means for mounting said welder on one of said sleeves so that said welder can rotate about said sleeve; and
means for rotating said welder about said sleeve to thereby weld said flanges.

7. Apparatus for aligning and joining sections of tubing comprising, in combination:
first and second aligning sleeves adapted for installation about said sections, said sleeves including a plurality of alignment pins around an inner surface thereof which center said sections with respect to the outer surfaces of said sleeves;
alignment means adapted for installation about said sleeves, said alignment means including a plurality of parallel alignment bars which contact said outer surfaces and apply forces thereto thereby to align said sleeves with respect to each other and consequently align said sections with respect to each other;
means for forcing said sleeves together while said sleeves are aligned so that said sections abut; and
means for joining said sections while said sections are maintained in an aligned and abutting configuration.

8. Apparatus in accordance with claim 7 wherein said forcing means includes means for preloading said sections in compression, said joining means comprises a welder for welding said sections together, and further including means for controlling the temperature of said sections adjacent to said welding so as to prevent damage to said sections from excessive heat.

9. Apparatus for aligning and joining sections of tubing having flanges on the ends thereof comprising, in combination:
an alignment apparatus adapted for installation about said flanges for aligning said flanges and thereby said sections with respect to each other, said alignment apparatus including a plurality of alignment means contacting the outer peripheries of said flanges at approximately equal angular intervals and adapted to transmit forces to said flanges for aligning said flanges with respect to each other;
means for forcing said flanges together while said flanges are aligned so that said flanges abut; and
means for joining said flanges while said flanges are maintained in an aligned and abutting configuration.

* * * * *